United States Patent [19]
Ondetti

[11] 3,891,616
[45] June 24, 1975

[54] HYPOTENSIVE β-HOMOAMINOACID NONAPEPTIDES

[75] Inventor: Miguel Angel Ondetti, Princeton, N.J.

[73] Assignee: E. R. Squibb & Sons, Inc., Princeton, N.J.

[22] Filed: Apr. 17, 1974

[21] Appl. No.: 461,669

[52] U.S. Cl. ............................ 260/112.5; 424/177
[51] Int. Cl.² ................ C07C 103/52; C07G 7/00; A61K 37/00
[58] Field of Search ................................ 260/112.5

[56] References Cited
OTHER PUBLICATIONS

Suzuki et al.: Chem. Pharm. Bull., 14, 1017–23 (1966).
Chaturvedi et al.: J. Med. Chem., 13, 177–181 (1970).
Mandell et al.: Chem. Abstr., 64: 8119e (1966).
Schroder and Lubke, "The Peptides," Vol. 1, Academic Press, New York (1965), pp. 36–40.

*Primary Examiner*—Elbert L. Roberts
*Assistant Examiner*—Reginald J. Suyat
*Attorney, Agent, or Firm*—Lawrence S. Levinson; Merle J. Smith; Burton Rodney

[57] ABSTRACT

Peptides of the formula Arg-A-Pro-Gly-B-Ser-A-B-Arg wherein A is Pro or βH-Pro and B is Phe or βH-Phe, provided at least one A or B is a β-homoaminoacid, possess hypotensive activity and are more resistant to enzymatic degradation than the corresponding α-aminoacid peptide.

3 Claims, No Drawings

HYPOTENSIVE β-HOMOAMINOACID NONAPEPTIDES

BACKGROUND OF THE INVENTION

Bradykinin, a nonapeptide having the amino acid sequence Arg-Pro-Pro-Gly-Phe-Ser-Pro-Phe-Arg, has been found to possess hypotensive activity in mammalian species, e.g., mice and rats. A disadvantage of this nonapeptide, however, is its susceptibility to enzymatic degradation.

OBJECTS OF THE INVENTION

It is, accordingly, an object of the present invention to provide peptides having the hypotensive activity of bradykinin together with improved resistance to enzymatic degradation. Another object is to provide a method for preparing these peptides. These and other objects of the present invention will be apparent from the following description.

SUMMARY OF THE INVENTION

Peptides of the formula Arg-A-Pro-Gly-B-Ser-A-B-Arg wherein A is Pro or βH-Pro and B is Phe or βH-Phe, provided at least one of A or B is a β-homoaminoacid, possess hypotensive activity in mammalian species, e.g., mice and rats, and are more resistant to enzymatic degradation than the corresponding α-aminoacid peptide.

DETAILED DESCRIPTION

The β-homoaminoacid peptides of the present invention have the following aminoacid sequences:

1. Arg-Pro-Pro-Gly-Phe-Ser-Pro-βH-Phe-Arg
2. Arg-Pro-Pro-Gly-Phe-Ser-βH-Pro-βH-Phe-Arg
3. Arg-Pro-Pro-Gly-Phe-Ser-βH-Pro-Phe-Arg
4. Arg-Pro-Pro-Gly-βH-Phe-Ser-Pro-Phe-Arg
5. Arg-Pro-Pro-Gly-βH-Phe-Ser-Pro-βH-Phe-Arg
6. Arg-Pro-Pro-Gly-βH-Phe-Ser-βH-Pro-β-H-Phe-Arg
7. Arg-Pro-Pro-Gly-βH-Phe-Ser-βH-Pro-Phe-Arg
8. Arg-βH-Pro-Pro-Gly-Phe-Ser-Pro-Phe-Arg
9. Arg-βH-Pro-Pro-Gly-Phe-Ser-Pro-βH-Phe-Arg
10. Arg-βH-Pro-Pro-Gly-Phe-Ser-βH-Pro-βH-Phe-Arg
11. Arg-βH-Pro-Pro-Gly-Phe-Ser-βH-Pro-Phe-Arg
12. Arg-βH-Pro-Pro-Gly-βH-Phe-Ser-Pro-Phe-Arg
13. Arg-βH-Pro-Pro-Gly-βH-Phe-Ser-Pro-βH-Phe-Arg
14. Arg-βH-Pro-Pro-Gly-βH-Phe-Ser-βH-Pro-βH-Phe-Arg
15. Arg-βH-Pro-Pro-Gly-βH-Phe-Ser-βH-Pro-Phe-Arg

Bradykinin, a nonapeptide of the formula Arg-Pro-Pro-Gly-Phe-Ser-Pro-Phe-Arg, has hypotensive activity which, however, is too short acting to be of clinical utility. While a number of enzymes are known to degrade bradykinin, the enzyme or enzymes chiefly responsible for its inactivation in vivo is not known.

It has now been found, according to the present invention, that the foregoing β-homoamino acid nonapeptides not only retain the hypotensive activity of bradykinin, but also are more resistant to enzymatic degradation.

The following examples illustrate the present invention without, however, limiting the same thereto. All temperatures are expressed in degrees Centigrade.

EAMPLE 1

Preparation of Homoaminocid Intermediates.

A. Preparation of N-tert-Butyloxycarbonyl-L-2-Pyrrolidineacetic acid (Boc-βH-Pro)

A solution of tert-butyloxycarbonyl-L-proline (10.8 g) in a mixture of ethyl ether (100 ml) and triethylamine (7 ml) is chilled to −5°C. Ethyl chloroformate (4.9 ml) is added and the mixture is stirred at −5° for 10 minutes. The precipitate is filtered off and to the filtrate a solution of diazomethane is ether is added (prepared starting from 20 g of N-methyl-N'-nitro-N-nitrosoguanidine). After overnight standing at 5° the solvent is removed in vacuo, the residue is dissolved in ethyl acetate and washed with saturated NaHCO₃ and H₂O. The ethyl acetate is concentrated to dryness and the residue chromatographed on a column of silica gel.

The fraction containing the desired diazoketone are pooled, concentrated to dryness, and the residue is dissolved in methanol (35 ml). A small amount of silver benzoate dissolved in triethylamine is added, and when the evolution of nitrogen ceases, charcoal (1.5 g) is added. The mixture is filtered and the filtrate is concentrated to dryness in vacuo. The residue is dissolved in ethyl acetate and washed neutral. After removal of the ethyl acetate the residue is chromatographed on a silica gel column.

The fractions containing the desired methyl ester are pooled, concentrated to dryness, and the residue is dissolved in 100 ml of methanol and 30 ml of N NaOH. After 4 hours the mixture is neutralized with N Hcl, diluted with ethyl acetate and washed with saturated N NaHCO₃. The aqueous layer is acidified and extracted with ethyl acetate. After removing the ethyl acetate in vacuo the residue is crystallized from hexane. Yield 3.8 g, m.p. 99°–101°.

B. Preparation of N-tert-butyloxycarbonyl-L-3-amino-4-phenyl butyric acid (Boc-βH-Phe)

The foregoing compound is prepared following the procedure in A but starting from tert-butyloxycarbonyl-L-phenylalanine (19 g). Yield 2.6 g, m.p. 101°–102°.

EXAMPLE 2

Arg-Pro-Pro-Gly-Phe-Ser-Pro-βH-Phe-Arg tert-Butyloxycarbonylnitro-L-arginyl polystyrene resin (5 g, 0.5 mmoles of Arg/g resin) is soaked overnight in methylene chloride (50 ml) and then subjected to the following sequence of reactions:

1. Wash with methylene chloride (4×50 ml)
2. Wash with ethanol absolute (4×50 ml)
3. Wash with acetic acid (4×50 ml)
4. Stir with N HCl in acetic acid (1×50 ml), 5 min.
5. Repeat step 4, 25 min
6. Wash with acetic acid (4×50 ml)
7. Wash with ethanol (4×50 ml)
8. Wash with methylene chloride (4×50 ml)
9. Stir with a 68 percent solution of triethylamine in methylene chloride (50 ml), 5 min.
10. Wash with methylene chloride (1×50 ml)
11. Repeat step 9
12. Wash with methylene chloride (4×50 ml)
13. Stir with a solution of Boc-L-β-homo phenylalanine (2.09 g) in methylene chloride (35 ml) for 20 min.

14. Add a solution of N-N'-dicyclohexylacrbodiimide (1.55 g) in methylene chloride (2.5 ml) and stir for 3 hours 15. Repeat steps 1 to 12

16. Stir with a solution of Boc-L-proline (1.62 g) in methylene chloride (35 ml) for 20 minutes 17. Repeat step 14

18. Repeat steps 1 to 12

19. Stir with a solution of Boc-O-benzyl-L-serine (2.2 g) in methylene chloride (35 ml) for 20 minutes 20. Repeat step 14.

21. Repeat steps 1 to 12.

22. Stir with a solution of Boc-L-phenylalaine (2.0 g) in methylene chloride (35 ml) for 20 minutes 23. Repeat step 14

24. Repeat steps 1 to 12

25. Stir with a solution of Boc-Glycine (1.3 g) in methylene chloride (35 ml) for 20 minutes 26. Repeat step 14

27. Repeat steps 1 to 12

28. Stir with a solution of Boc-L-proline (1.62 g) in methylene chloride (35 ml) for 20 minutes 29. Repeat step 14

30. Repeat steps 1 to 12

31. Stir with a solution of Boc-L-proline (1.62 g) in methylene chloride (35 ml) for 20 minutes 32. Repeat step 14

33. Repeat steps 1 to 12

34. Stir with a solution of Boc-Nitro-L-arginine (2.4 g) in a mixture of dimethylformamide (12 ml) and methylene chloride (23 ml) for 20 minutes 35. Repeat step 14

36. Repeat steps 1 to 3

37. Repeat step 2, and dry resin overnight in vacuo

38. Suspend resin in trifluoroacetic acid (60 ml) and bubble hydrogen bromide through the suspension for 1 hour. Transfer the resin to a sinter glass funnel and wash with trifuloroacetic acid (2×30 ml) and 1:1 methylene chloride-trifluoroacetic acid (4×30 ml)

39. Concentrate the filtrate from step 38 to dryness in vacuo, disintegrate the residue with ether, filter the solid and wash thoroughly with ether.

40. Dissolve the solid obtained in step 39 in N HCl (3.6 ml) and 2:1 methanol-water (200 ml), add 10 percent palladium on charcoal (360 mg) and hydrogenate at atmospheric pressure until the disappearance of the nitroguanidine absorption at 270 m$\mu$. Filter the catalyst off, and concentrate the filtrate to dryness in vauco. Dissolve the residue in water, and freeze-dry.

EXAMPLE 3

Arg-Pro-Pro-Gly-Phe-Ser-$\beta$H-Pro-$\beta$H-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–15. As per example 2.

16. Stir with a solution of Boc-L-$\beta$-homo proline (1.7 g) in methylene chloride (35 ml) for 20 minutes.

17–40. As per example 2.

EXAMPLE 4

Arg-Pro-Gly-Phe-Ser-$\beta$H-Pro-Phe-Arg tert. Butyloxycarbonyl-L-arginyl polystyrene resin (5 g. 0.5 mmoles of Arg/g resin) is soaked overnight in methylene chloride (50 ml) and then subjected to the following sequence of reactions:

1–12. As per example 2.

13. Stir with a solution of Boc-L-phenylalanine (2.0 g) in methylene chloride (35 ml) for 20 minutes.

14–15. As per example 2.

16. Stir with a solution of Boc-L-$\beta$-homo proline (1.7 g) in methylene chloride (35 ml) for 20 minutes.

17–40. As per example 2.

EXAMPLE 5

Arg-Pro-Pro-Gly-$\beta$H-Phe-Ser-Pro-Phe-Arg tert. Butyloxycarbonyl-L-arginyl polstrene resin (5 g, 0.5 mmoles of Arg/g resin) is soaked overnight in methylene chloride (50 ml) and then subjected to the following sequence of reactions:

1–12. As per example 2.

13. Stir with a solution of Boc-L-phenylalanine (2.0 g) in methylene chloride (35 ml) for 20 minutes.

14–21. As per example 2.

22. Stir with a solution of Boc-L-$\beta$-homo phenylalanine (2.09 g) in methylene chloride (35 ml) for 20 minutes.

23–40. As per example 2.

EXAMPLE 6

Arg-Pro-Pro-Gly-$\beta$H-Phe-Ser-Pro-$\beta$H-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–21. As per example 2.

22. Stir with a solution of Boc-L-$\beta$-homo phenylalanine (1.7 g) in methylene chloride (35 ml) for 20 minutes.

23–40. As per example 2.

EXAMPLE 7

Arg-Pro-Pro-Gly-$\beta$H-Phe-Ser-$\beta$H-Pro-$\beta$H-Phe-Arg tert. Butyloxycarbonyl-L-arginyl polystyrene resin (5 g. 0.5 mmoles of Arg/g resin) is soaked overnight in methylene chloride (50 ml) and then subjected to the following sequence of reactions:

1–15. As per example 2.

16. Stir with a solution of Boc-L-$\beta$-homo proline (1.7 g) in methylene chloride (35 ml) for 20 minutes.

17–21. As per example 2.

22. Stir with a solution of Boc-L-$\beta$-homo phenylalanine (2.09 g) in methylene chloride (35 ml) for 20 minutes.

23–40. As per example 2.

EXAMPLE 8

Arg-Pro-Pro-Gly-$\beta$H-Phe-Ser-$\beta$H-Pro-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–12. As per example 2.

13. Stir with a solution of Boc-L-Phenylalanine (2.0 g) in methylene chloride (35 ml) for 20 minutes.

14–15. As per example 2.

16. Stir with a solution of Boc-L-$\beta$-homo proline (1.7 g) in methylene chloride (35 ml) for 20 minutes.

17–21. As per example 2.

22. Stir with a solution of Boc-L-β-homo phenylalanine (2.09 g) in methylene chloride (35 ml) for 20 minutes.

23–40. As per example 2.

EXAMPLE 9

Arg-βH-Pro-Pro-Gly-Phe-Ser-Pro-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–12. As per example 2.

13. Stir with a solution of Boc-L-phenylalanine (2.0 g) in methylene chloride (35 ml) for 20 minutes.

14–30. As per example 2.

31. Stir with a solution of Boc-L-β-homo proline (1.7 g) in methylene chloride (35 ml) for 20 minutes.

32–40. As per example 2.

EXAMPLE 10

Arg-βH-Pro-Pro-Gly-Phe-Ser-Pro-βH-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–30. As per example 2.

31. Stir with a solution of Boc-L-β-homo proline (1.7 g) in methylene chloride (35 ml) for 20 minutes.

32–40. As per example 2.

EXAMPLE 11

Arg-βH-Pro-Pro-Gly-Phe-Ser-βH-Pro-βH-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–15. As per example 2.

16. Stir with a solution of Boc-L-β-homo proline (1.7 g) in methylene chloride (35 ml) for 20 minutes.

17–30. As per example 2.

31. Stir with a solution of Boc-L-β-homo proline (1.7 g) in methylene chloride (35 ml) for 20 minutes.

32–40. As per example 2.

EXAMPLE 12

Arg-βH-Pro-Pro-Gly-Phe-Ser-βH-Pro-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–12. As per example 2.

13. Stir with a solution of Boc-L-phenylalanine (2.0 g) in methylene chloride (35 ml) for 20 minutes.

14–15. As per example 2.

16. Stir with a solution of Boc-L-β-homo proline (1.7 g) in methylene chloride (35 ml) for 20 minutes.

17–30. As per example 2.

31. Stir with a solution of Boc-L-β-homo proline (1.7 g) in methylene chloride (35 ml) for 20 minutes.

32–40. As per example 2.

EXAMPLE 13

Arg-βH-Pro-Pro-Gly-βH-Phe-Ser-Pro-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions: 1–12. As per example 2.

13. Stir with a solution of Boc-L-phenylalanine (2.0 g) in methylene chloride (35 ml) for 20 minutes.

14–21. As per example 2.

22. Stir with a solution of Boc-L-β-homo phenylalanine (1.7 g) in methylene chloride (35 ml) for 20 minutes.

23–30. As per example 2.

31. Stir with a solution of Boc-L-β-homo proline (1.7 g) in methylene chloride (35 ml) for 20 minutes.

32–40. As per example 2.

EXAMPLE 14

Arg-βH-Pro-Pro-Gly-βH-Phe-Ser-Pro-βH-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–21. As per example 2.

22. Stir with a solution of Boc-L-β-homo phenylalanine (1.7 g) in methylene chloride (35 ml) for 20 minutes.

23–30. As per example 2.

31. Stir with a solution of Boc-L-β-homo proline (1.7 g) in methylene chloride (35 ml) for 20 minutes.

32–40. As per example 2.

EXAMPLE 15

Arg-βH-Pro-Pro-Gly-βH-Phe-Ser-βH-Pro-βH-Phe-Arg tert. Butyloxycarbonyl-L-arginyl polystyrene resin (5 g, 0.5 mmoles of Arg/g resin) is soaked overnight in methylene chloride (50 ml) and then subjected to the following sequence of reactions:

1–15. As per example 2.

16. Stir with a solution of Boc-L-β-homo proline (1.7 g) in methylene chloride (35 ml) for 20 minutes.

17–21. As per example 2.

22. Stir with a solution of Boc-L-β-homo phenylalanine (1.7 g) in methylene chloride (35 ml) for 20 minutes.

23–30. As per example 2.

31. Stir with a solution of Boc-L-β-homo proline (1.7 g) in methylene chloride (35 ml) for 20 minutes.

32–40. As per example 2.

EXAMPLE 16

Arg-βH-Pro-Pro-Gly-βH-Phe-Ser-βH-Pro-Phe-Arg tert. Butyloxycarbonyl-L-arginyl polystyrene resin (5 g, 0.5 mmoles of Arg/g resin) is soaked overnight in methylene chloride (50 ml) and the subjected to the following sequence of reactions:

1–12. As per example 2.

13. Stir with a solution of Boc-L-phenylalanine (2.0 g) in methylene chloride (35 ml) for 20 minutes.

14–15. As per example 2.

16. Stir with a solution of Boc-L-β-homo proline (1.7 g) in methylene chloride (35 ml) for 20 minutes.

17–21. As per example 2.

22. Stir with a solution of Boc-L-β-homo phenylalanine (1.7 g) in methylene chloride (35 ml) for 20 minutes.

23–30. As per example 2.

31. Stir with a solution of Boc-L-β-homo proline (1.7 g) in methylene chloride (35 ml) for 20 minutes.

32–40. As per example 2.

EXAMPLE 17

Digestion with Chymotrypsin

A sample of Arg-Pro-Pro-Gly-Phe-Ser-Pro-βHPhe-Arg (1 mg) is dissolved in ammonium acetate buffer pH 7.5 (4 ml). A solution of chymotrypsin (2 mg/ml in ammonium acetate buffer) is added and the solution is incubated at 37°C for 16 hours. Acetic acid (0.2 ml) is added and the solution is freeze dried. A sample of bradykinin (1 mg) is treated in the same way. Samples from both digestion mixtures are compared by electrophoresis at pH 1.9. The bradykinin sample shows a complete release of the C-terminal arginine residue, but no arginine is observed in the digestion mixture of the β-homophenylalanine analog.

EXAMPLE 18

Digestion with Angiotensin-Converting Enzyme

A sample of Arg-Pro-Pro-Gly-Phe-Ser-βHPro-Phe-Arg (1.1 mg) is dissolved in a mixture of 1 M ammonium acetate (0.4 ml) and water (3.4 ml). Angiotensin-converting enzyme solution (0.2 ml) is added and the mixture is incubated at 37° for 6 hours. A sample of bradykinin is processed in the same way and aliquots from both digestion mixtures are compared by electrophoresis at pH 1.9. The bradykinin sample shows complete release of the C-terminal dipeptide Phe-Arg, but none is present in the sample of the βHPro analog.

EXAMPLE 19

Digestion with Angiotensin-Converting Enzyme

A sample of Arg-Pro-Pro-Gly-Phe-Ser-Pro-βHPhe-Arg (1 mg) is dissolved in a mixture of 1 M ammonium acetate (0.4 ml) and water (3.4 ml). Angiotensin-converting enzyme solution (0.2 ml) is added and the mixture is incubated at 37° for 6 hours. A sample of bradykinin is processed in the same way and aliquots from both digestion mixtures are compared by electrophoresis at pH 1.9. The bradykinin sample shows complete release of the C-terminal dipeptide Phe-Arg, but no βHPhe-Arg is present in the sample of the βHPhe analog.

EXAMPLE 20

Digestion with Chymotrypsin

A sample of Arg-Pro-Pro-Gly-βPhe-Ser-Pro-Phe-Arg (1 mg) is dissolved in ammonium acetate buffer pH 7.5 (4 ml). A solution of chymotrypsin (2 mg/ml in ammonium acetate buffer) is added and the solution is incubated at 37°C for 16 hours. Acetic acid (0.2 ml) is added and the solution is freeze dried. A sample of bradykinin (1 mg) is treated in the same way. Samples from both digestion mixtures are compared by electrophoresis at pH 1.9. The bradykinin sample shows a complete release of the N-terminal Arg-Pro-Pro-Gly-Phe pentapeptide, but no Arg-Pro-Pro-Gly-βHPhe pentapeptide is observed in the digestion mixture of the β-homophenylalanine analog.

EXAMPLE 21

Digestion with Prolidase

A sample of Arg-βH-Pro-Pro-Gly-Phe-Ser-Pro-Phe-Arg (1.1 mg) is dissolved in 0.5 M tris buffer pH 8 (4 ml). A solution of commercial prolidase (previously treated with diisopropylfluorophosphate and then activated with MnSO₄) in the same buffer is added and the solution is then incubated at 37° for 16 hours. A sample of bradykinin is treated in the same way. Samples from both digestion mixtures are compared by electrophoresis at pH 1.9. The bradykinin sample shows a complete release of the N-terminal arginine residue, but no arginine is observed in the digestion mixture of the β-homoproline analog.

What is claimed is:

1. A nonapeptide of the formula Arg-A-Pro-Gly-B-Ser-A-B-Arg wherein A is Pro or βH-Pro and B is Phe or βH-Phe, wherein βH-Pro represents β-homoproline and βH-Phe represents β-homophenylanine, provided at least one of A or B is a β-homoaminoacid, all amino acids thereof being of the L-configuration.

2. A nonapeptide according to claim 1 having the amino acid sequence

Arg-Pro-Pro-Gly-Phe-Ser-Pro-βH-Phe-Arg,
Arg-Pro-Pro-Gly-Phe-Ser-βH-Pro-βH-Phe-Arg,
Arg-Pro-Pro-Gly-Phe-Ser-βH-Pro-Phe-Arg,
Arg-Pro-Pro-Gly-βH-Phe-Ser-Pro-Phe-Arg,
Arg-Pro-Pro-Gly-βH-Phe-Ser-Pro-βH-Phe-Arg,
Arg-Pro-Pro-Gly-βH-Phe-Ser-βH-Pro-βH-Phe-Arg,
Arg-Pro-Pro-Gly-βH-Phe-Ser-βH-Pro-Phe-Arg,
Arg-βH-Pro-Pro-Gly-Phe-Ser-Pro-Phe-Arg,
Arg-βH-Pro-Pro-Gly-Phe-Ser-Pro-βH-Phe-Arg,
Arg-βH-Pro-Pro-Gly-Phe-Ser-βH-Pro-βH-Phe-Arg,
Arg-βH-Pro-Pro-Gly-Phe-Ser-βH-Pro-Phe-Arg,
Arg-βH-Pro-Pro-Gly-βH-Phe-Ser-Pro-Phe-Arg,
Arg-βH-Pro-Pro-Gly-βH-Phe-Ser-Pro-β-H-Phe-Arg,
Arg-βH-Pro-Pro-Gly-βH-Phe-Ser-βH-Pro-βH-Phe-Arg or
Arg-βH-Pro-Pro-Gly-βH-Phe-Ser-βH-Pro-Phe-Arg.

3. A nonapeptide according to claim 1 having the amino acid sequence

Arg-Pro-Pro-Gly-Phe-Ser-Pro-βH-Phe-Arg or
Arg-Pro-Pro-Gly-Phe-Ser-βH-Pro-Phe-Arg.

* * * * *

UNITED STATES PATENT AND TRADEMARK OFFICE
CERTIFICATE OF CORRECTION

PATENT NO. : 3,891,616
DATED : June 24, 1975
INVENTOR(S) : Miguel Angel Ondetti

It is certified that error appears in the above-identified patent and that said Letters Patent are hereby corrected as shown below:

Column 1, line 39, "β-H" should read --βH--.
Column 2, line 2, "Homoaminocid" should read --Homoaminoacid--.
Column 3, line 65 should read --Arg-Pro-Pro-Gly-Phe-Ser-βH-Pro-Phe-Arg--.
Column 6, line 53, "the" should read --then--.
Column 7, line 47, "βPhe" should read --βHPhe--.
Column 8, line 27, "β-homophenylanine" should read --β-homophenylalanine--.
Column 8, line 44, "β-H" should read --βH--.

Signed and Sealed this sixth Day of January 1976

[SEAL]

Attest:

RUTH C. MASON
Attesting Officer

C. MARSHALL DANN
Commissioner of Patents and Trademarks